(12) United States Patent
Naegele et al.

(10) Patent No.: US 6,490,932 B1
(45) Date of Patent: Dec. 10, 2002

(54) APPARATUS AND METHOD OF PRODUCING PRESSURE SENSORS AND DIAPHRAGMS FOR SAID PRESSURE SENSORS

(75) Inventors: Erwin Naegele, Hessigheim (DE); Martin Mast, Gerlingen (DE); Werner Fischer, Blaichach (DE); Rainer Foerstner, Burgberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,067
(22) PCT Filed: Jan. 9, 1998
(86) PCT No.: PCT/DE98/00088
§ 371 (c)(1),
(2), (4) Date: Jul. 2, 1999
(87) PCT Pub. No.: WO98/30877
PCT Pub. Date: Jul. 16, 1998

(30) Foreign Application Priority Data

Jan. 13, 1997 (DE) .......................................... 197 00 773

(51) Int. Cl.⁷ .................................................. G01L 7/08
(52) U.S. Cl. ........................................................ 73/715
(58) Field of Search .......................... 73/715, 716, 717, 73/721, 754, 756, 718, 724; 29/825; 361/283.4, 283

(56) References Cited

U.S. PATENT DOCUMENTS

| | | | | |
|---|---|---|---|---|
| 3,800,264 A | * | 3/1974 | Kurtz et al. .................... 338/2 |
| 4,787,250 A | * | 11/1988 | Varrese ......................... 73/715 |
| 5,144,843 A | * | 9/1992 | Tamura et al. ................. 73/727 |
| 5,212,989 A | * | 5/1993 | Kodama et al. ............... 73/706 |
| 5,275,054 A | * | 1/1994 | Park ............................. 73/724 |
| 5,581,226 A | * | 12/1996 | Shah ............................. 338/42 |
| 5,761,324 A | * | 6/1998 | Kanai et al. ................. 381/190 |

FOREIGN PATENT DOCUMENTS

| | | |
|---|---|---|
| DE | 39 12 217 A1 | 10/1990 |
| DE | 42 11 247 C2 | 4/1996 |
| DE | 4211247 | * 4/1996 .................. 73/754 |

* cited by examiner

Primary Examiner—William Oen
(74) Attorney, Agent, or Firm—Michael J. Striker

(57) ABSTRACT

A method of producing a number of pressure sensors includes joining a plurality of support bodies to a metal component, the metal component forming a diaphragm, applying a thin-film coating to produce the sensor elements, and finally dividing the metal component provided with the thin-film coating and the support bodies into a plurality of pressure sensors, each having a single one of the support bodies so that the number of pressure sensors formed corresponds to the plurality of the support bodies.

7 Claims, 1 Drawing Sheet

APPARATUS AND METHOD OF PRODUCING PRESSURE SENSORS AND DIAPHRAGMS FOR SAID PRESSURE SENSORS

BACKGROUND OF THE INVENTION

1. Field of the Invention

The present invention relates to an improved method for producing pressure sensors comprising diaphragms and to diaphragms for said pressure sensors.

2. Prior Art

The invention relates to a diaphragm for a pressure sensor as generically defined by the preamble to the main claim.

In conventional metal diaphragms, especially for high-pressure sensors, the entire diaphragm, including the support elements, is preferably made in one piece of stainless steel. Because of the stringent demands made in terms of the properties of the diaphragms, production of the one-piece metal part requires complicated work steps such as turning, grinding, lapping and polishing to a high gloss. To further complete the diaphragm with sensor elements, a thin-film coating on the metal diaphragms is necessary in many cases.

SUMMARY OF THE INVENTION

The diaphragm according to the invention is advantageous because the diaphragm face can be made separately and economically as a part comprising a special steel band, and the required properties are assured in a simple way. For diaphragm thicknesses of approximately 0.4 to 1 mm (and optionally even greater), thickness tolerances of <5% of the diaphragm thickness should be adhered to. The surface quality on the top side should have a value of Rz<0.1 $\mu$m.

To make it simple to positionally fix the metal diaphragm, the diaphragm part stamped out of the special steel band has a fixation lug on its outside.

The diaphragm of the invention can also advantageously be produced in a group blank production process, in which a single sheet-metal part can include a plurality of support bodies and thus a plurality of diaphragms. The requisite production processes for the thin-film coating can advantageously be applied to all the diaphragm faces of the special steel band simultaneously.

Further advantageous embodiments are defined by the dependent claims.

BRIEF DESCRIPTION OF THE DRAWING

Exemplary embodiments of a diaphragm for a pressure sensor will be described in conjunction with the drawing. Shown are.

DESCRIPTION OF THE EXEMPLARY EMBODIMENTS

Figure 1:
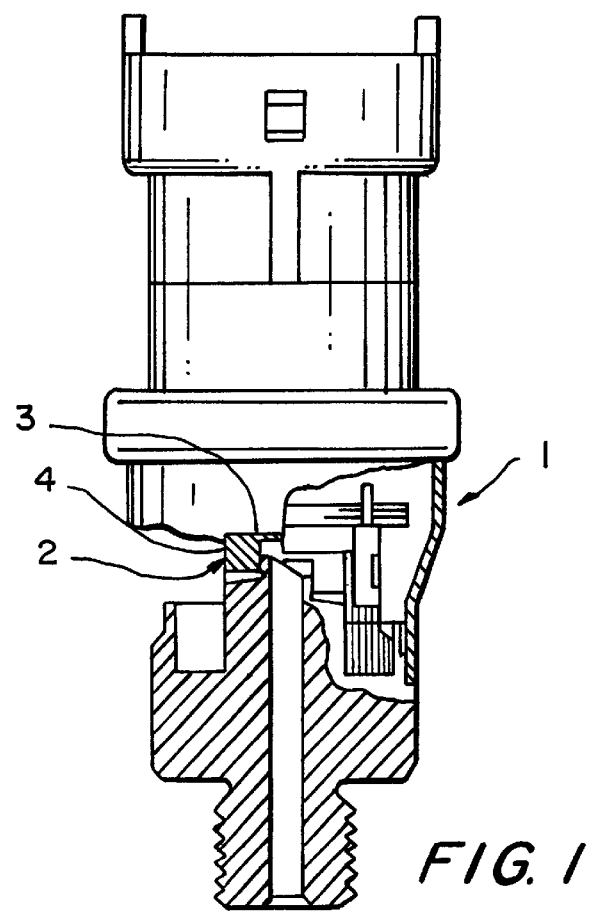
FIG. 1, a basic illustration of a pressure sensor with a diaphragm conventionally produced in one piece.

In FIG. 1, a pressure sensor 1 is shown, which in its interior has a diaphragm 2 that can be acted upon, on the side of the diaphragm face 3, with a liquid or gas pressure and which carries sensor elements on one side of the diaphragm face 3. The diaphragm 2 of FIG. 1 is a conventional version, which is produced in one piece with a support body 4.

Figure 2B:
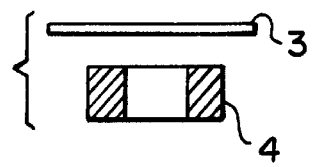
FIG. 2, a basic illustration of a diaphragm according to the invention, with a support body soldered onto it.
Figure 2A:
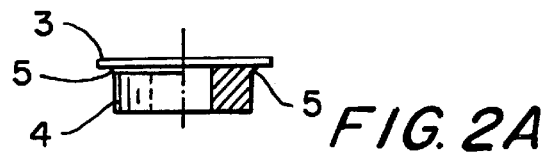

The diaphragm 2 of FIG. 2 is a version according to the invention, which comprises a pre-fabricated band part 3 as the diaphragm face and a likewise separately produced support body 4 and joined to it via a solder seam 5. A rolled or stamped part, a special steel band, or a sheet-metal part can for instance be used as the band part 3. The support body 4 may be embodied as a ring or as a part of rectangular or square cross section. In a simple way, it can be produced economically as a stamped part.

Figure 3:
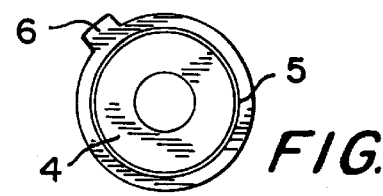
FIG. 3, a view of a support body with the fixation lug.

The embodiment of FIG. 3 has a band part 3, which for positional fixation of the diaphragm 2 and the pressure sensor 1 has a fixation lug 6.

Figure 4:
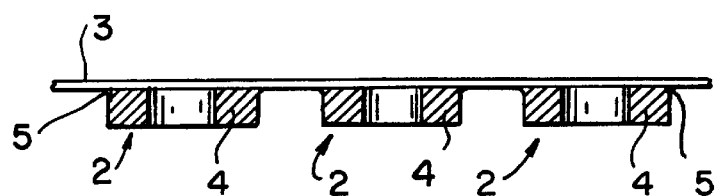
FIG. 4, a view of diaphragms produced in a group-blank version.

In the embodiment of FIG. 4, a number of diaphragms 2 are made on a single band part 3. This group blank is then, after the thin-film coating, divided up into the individual parts. The support bodies 4 are soldered to the band part 3 as described above. The thin-film coating, not visible here, for producing sensor elements can be applied in a manner known per se to the top side of the band part 3.

What is claimed is:

1. A method of producing a number of pressure sensors (1), said method comprising the steps of:

a) joining a plurality of support bodies (4) to a metal component, said metal component forming a diaphragm (3);

b) applying a thin-film coating to the metal component to produce sensor elements; and c) finally dividing the metal component provided with the thin-film coating in step b) and the support bodies (4) in step a) into a plurality of pressure sensors (1), each having a single one of said support bodies so that the number of pressure sensors formed corresponds to said plurality of said support bodies.

2. The method as defined in claim 1, wherein the metal component has a thickness tolerance amounting to <5% of a thickness of said diaphragm (3) and a surface quality on a top side thereof having a value of Rz<0.1 $\mu$m.

3. The method as defined in claim 1, wherein said metal component is a sheet metal band.

4. The method as defined in claim 3, wherein said sheet metal band is a steel band.

5. The method as defined in claim 1, wherein said joining is by soldering to form a solder seam (5) between the metal component and each of the supporting bodies (4).

6. A diaphragm provided with sensor elements for detecting a pressure in a pressure sensor, the diaphragm comprising a portion of a metal component and a ring acting as support body (4), said ring and said portion of said metal component being joined together by soldering to form a solder seam (5) therebetween.

7. The diaphragm as defined in claim 6, wherein said metal component is a metal band and said portion of said metal component includes at least one fixation lug (6).

* * * * *